(12) United States Patent
Kirschner

(10) Patent No.: US 6,427,972 B1
(45) Date of Patent: Aug. 6, 2002

(54) MAGNET VALVE, IN PARTICULAR FOR A SLIP-CONTROLLED HYDRAULIC VEHICLE BRAKE SYSTEM

(75) Inventor: Martin Kirschner, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,706
(22) PCT Filed: Jun. 18, 1999
(86) PCT No.: PCT/DE99/01789
§ 371 (c)(1),
(2), (4) Date: Feb. 12, 2001
(87) PCT Pub. No.: WO00/18628
PCT Pub. Date: Apr. 6, 2000

(30) Foreign Application Priority Data

Sep. 24, 1998 (DE) .......................... 198 43 762

(51) Int. Cl.⁷ .............................. F16K 31/02
(52) U.S. Cl. .................................. 251/129.15
(58) Field of Search ................ 251/129.15; 137/549

(56) References Cited

U.S. PATENT DOCUMENTS 5,542,755 A * 8/1996 Staib et al. .............. 303/119.2
6,084,493 A * 7/2000 Siegel ................... 251/129.15
6,318,703 B1 * 11/2001 Goossens et al. ....... 251/129.15

* cited by examiner

Primary Examiner—Lesley D. Morris
Assistant Examiner—Patrick Buechner
(74) Attorney, Agent, or Firm—Ronald E. Greigg

(57) ABSTRACT

The invention relates to a magnet valve, in particular for a slip-controlled hydraulic vehicle brake system, having a valve carrier bush and a guide sleeve, extending through an opening of the valve carrier bush and joined thereto by positive engagement by means of a caulked feature, in which sleeve an armature and a valve closing body are received displaceably relative to a magnet core and a valve seat, and having an electrical coil surrounding the guide sleeve in the region of the magnet core. The invention proposes that a flange, embodied as a radially outward-pointing crease is formed onto the guide sleeve and is braced in fluid- and pressure-tight fashion by the caulked feature against a radially inner, steplike shoulder of the valve carrier bush, and the flange has flat end portions, extending transversely to a magnet valve axis, which rest on one another substantially without any space between them.

13 Claims, 3 Drawing Sheets

MAGNET VALVE, IN PARTICULAR FOR A SLIP-CONTROLLED HYDRAULIC VEHICLE BRAKE SYSTEM

BACKGROUND OF THE INVENTION

1. Field of the Invention

This invention relates to a magnet valves and more particularly to an improved magnet valve, especially for a slip-controlled hydraulic vehicle brake system;

2. Description of the Prior Art

One prior art magnet valve the type with which this invention is concerned is known from German Patent Disclosure DE 43 37 435 A1. This known magnet valve has a guide sleeve, which protrudes into a valve block and inside of which an armature and a valve closing body are disposed, movable relative to a magnet core and a valve seat. The guide sleeve extends through a valve carrier bush, which is inserted into a receiving bore formed in the valve block and is caulked there.

The guide sleeve, on its radially outer circumferential surface has a radially outward-oriented bead extending all the way around which engages an annular recess in the valve carrier bush. As a result, the guide sleeve is axially secured to the valve carrier bush. The annular recess is made by first creating an axial bore in the valve carrier bush, and this bore narrows as a result of a conical-straight transition portion. The guide sleeve is then thrust into the bore until the curved bead is opposite the conical-straight transition portion of the valve carrier bush. A notchlike annular groove is then pressed into the face end of the valve carrier bush, creating a material bead that covers the bead on the guild sleeve. For sealing the magnet valve off from the outside, a sealing ring is provided between the guide sleeve and the inner wall of the receiving bore.

The known magnet valve has the disadvantage that because of the unfavorable conformance conditions, gaps still exist between the bead of the guide sleeve and the conical transition of the valve carrier bush, and hydraulic fluid can flow through these gaps. In particular the conformance between the circular-arclike bead and the conical-straight transition portion of the valve carrier bush is inadequate for sealing purposes. An additional sealing ring is therefore necessary, in order to seal off the receiving bore from the outside.

SUMMARY OF THE INVENTION

The valve block of the present invention has the advantage over the above prior art device in that the flat end faces of the flange form sealing faces, which are complimentary to the flat end face of the shoulder and rest flatly on them and on the caulked bead, and as a result they seal off the magnet valve without gaps. It is therefore possible to dispense with the additional seals. Because the flange is embodied as a crease without any interstice, the wall thickness of the flange at its fastening point in the valve carrier bush is doubled, which has a favorable effect on the fastening rigidity and strength. As a result, additional intermediate bodies around which the formed-on flange fits can also be dispensed with.

It is especially advantageous that the flange extends as far as the radially inner circumferential wall of the valve carrier bush. As a result, the radially outer circumferential surface of the flange can act as an additional sealing edge.

BRIEF DESCRIPTION OF THE DRAWINGS

The foregoing and other advantages of the invention will be apparent from the detailed description contained hereinbelow, taken with the drawings, in which.

DESCRIPTION OF THE EXEMPLARY EMBODIMENTS

Figure 1:
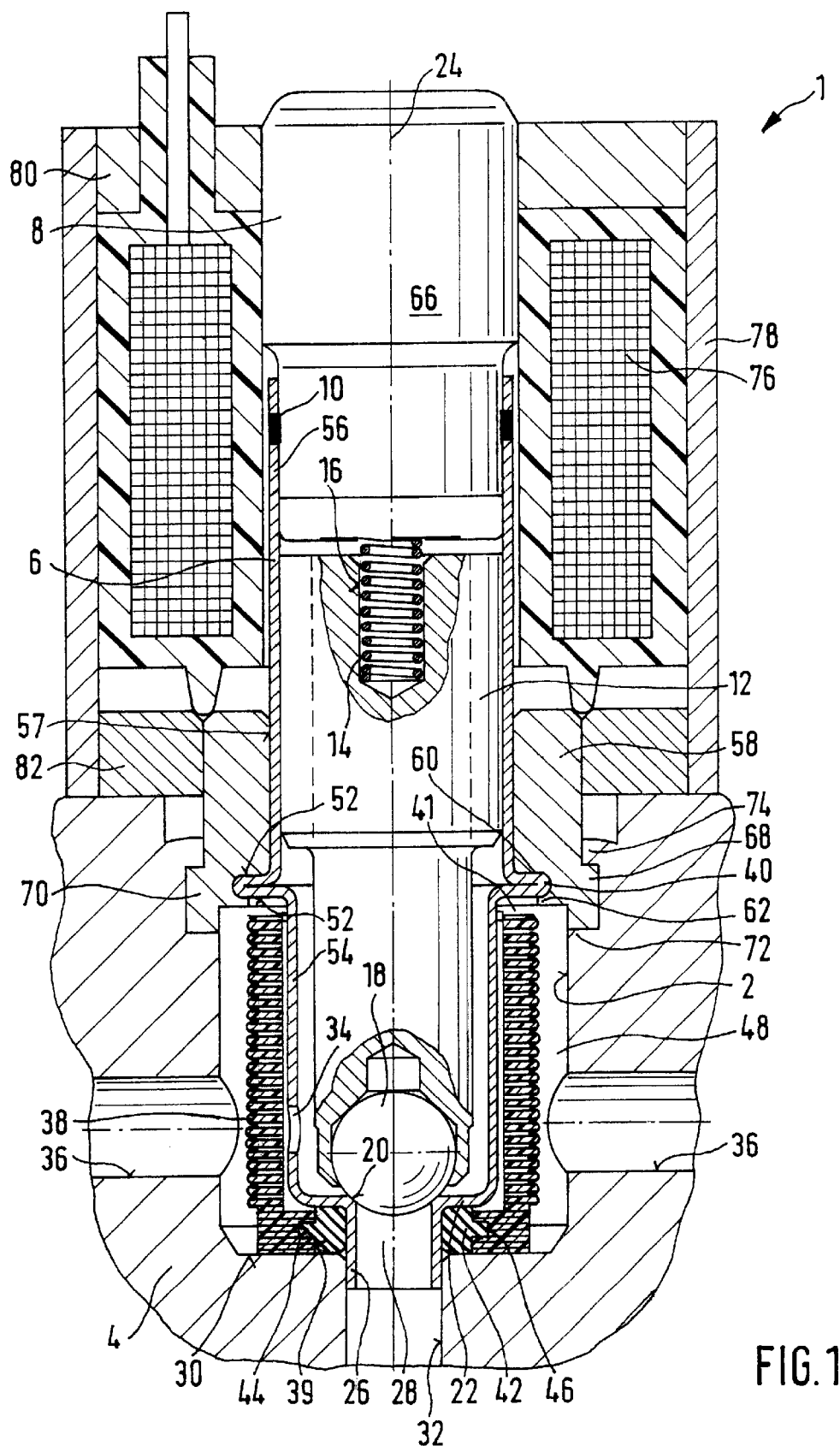
FIG. 1 is a longitudinal section through a preferred exemplary embodiment according to the invention.

The embodiment of the invention shown in FIG. 1, a magnet valve 1 is received in a receiving bore 2 of a valve block 4, which forms one part of a hydraulic assembly, not otherwise shown, for slip-controlled motor vehicle brake systems. The magnet valve 1 is a 2/2-way outlet valve, which in its basic position shown in FIG. 1 blocks the return flow of brake fluid from the wheel brake cylinder to a return pump.

The magnet valve 1 has a guide sleeve 6, into whose open end, protruding from the valve block 4, a magnet core 8 is inserted partway and is joined on its radially outer circumference to the guide sleeve 6 in pressure- and fluid-tight fashion by means of a weld 10 extending all the way around. In the axial direction, the magnet core 8 is adjoined by an armature 12, received axially displaceably inside the guide sleeve 6; the armature is supported, with its end pointing away from the valve block 4, on the magnet core 8 by a valve closing spring 14, which is inserted into a blind bore 16 in the armature 12. On the other, narrowed end of the displaceable armature 12, there is a blind bore, into which a valve closing body, preferably a hardened ball 18, is inserted. The ball 18 is pressed into a valve seat 20 by the pressure of the valve closing spring 14. The magnet valve 1 is then in its basic position that is closed when there is no current.

The guide sleeve 6, on its end remote from the magnet core 8, has a formed-on bottom 22, in which the valve seat 20 is embodied as an opening coaxial with the magnet valve axis 24. With the same inside diameter as the valve seat 20 and coaxially with it, a formed-on sleevelike extension 26 extends away from the bottom 22 of the guide sleeve 6 and forms a valve outlet 28. The receiving bore 2 of the magnet valve 1 is a blind bore in the valve block 4, into whose bottom 30 an outlet conduit 32 of the valve block 4 discharges. The sleevelike extension 26, forming the valve outlet 28, is inserted into the outlet conduit 32 on the bottom of the receiving bore 2.

The guide sleeve 6, on its end remote from the magnet core 8, has a valve inlet 34, embodied as a transverse bore, which communicates with inlet conduits 36 of the valve block 4. The inlet conduits 36 comprise radial bores in the valve block 4, tranversely to the magnet valve axis 24.

A cup-shaped filter element 38 is disposed between the valve inlet 34 and the inlet conduits 36; it is fitted in cufflike fashion over the end, remote from the magnet core, of the guide sleeve 6 and surrounds the guide sleeve, especially in the region of the valve inlet 34. The bottom of the filter element 38 has a filter opening 39, which is coaxial with the magnet valve axis 24 and through which the sleevelike extension 26 of the guide sleeve 6 protrudes. The filter element 38 is open toward the top and extends axially as far as a flange 40 of the guide sleeve 6. The filter element 38 is preferably an injection-molded plastic part, with rings disposed one above the other that are kept axially spaced apart from one another by longitudinal ribs. Between the upper end of the filter element 38 and the flange 40, there is an axial filtering gap 41, whose vertical clearance is no greater than the mesh height of the filter element 38.

A sealing ring 42 is slipped onto the bottom sleevelike extension 26 of the guide sleeve 6 and seals off the inlet conduits 36 from the outlet conduit 32. The sealing ring 42 carries the filter element 38, in that on its radially outer circumferential surface it has an annular protrusion 44, which engages a radially inner annular groove 46 in the filter element 38. The sealing ring 42 is thus integrated with the filter element 38 and in the assembly process is slipped together with the filter element 38 onto the guide sleeve 6. The sealing ring 42 is somewhat thicker than the filter element 38 in the connection region, so that the sealing and fastening forces will be absorbed solely by the sealing ring 42. The sealing ring 42 engages both the bottom 22 of the guide sleeve 6 and the bottom 30 of the receiving bore 2. For connecting the inlet conduits 36 to one another, an annular chamber 48 is formed between the radially outer circumferential surface of the filter element 38 and the radially inner wall of the receiving bore 2.

Figure 2:
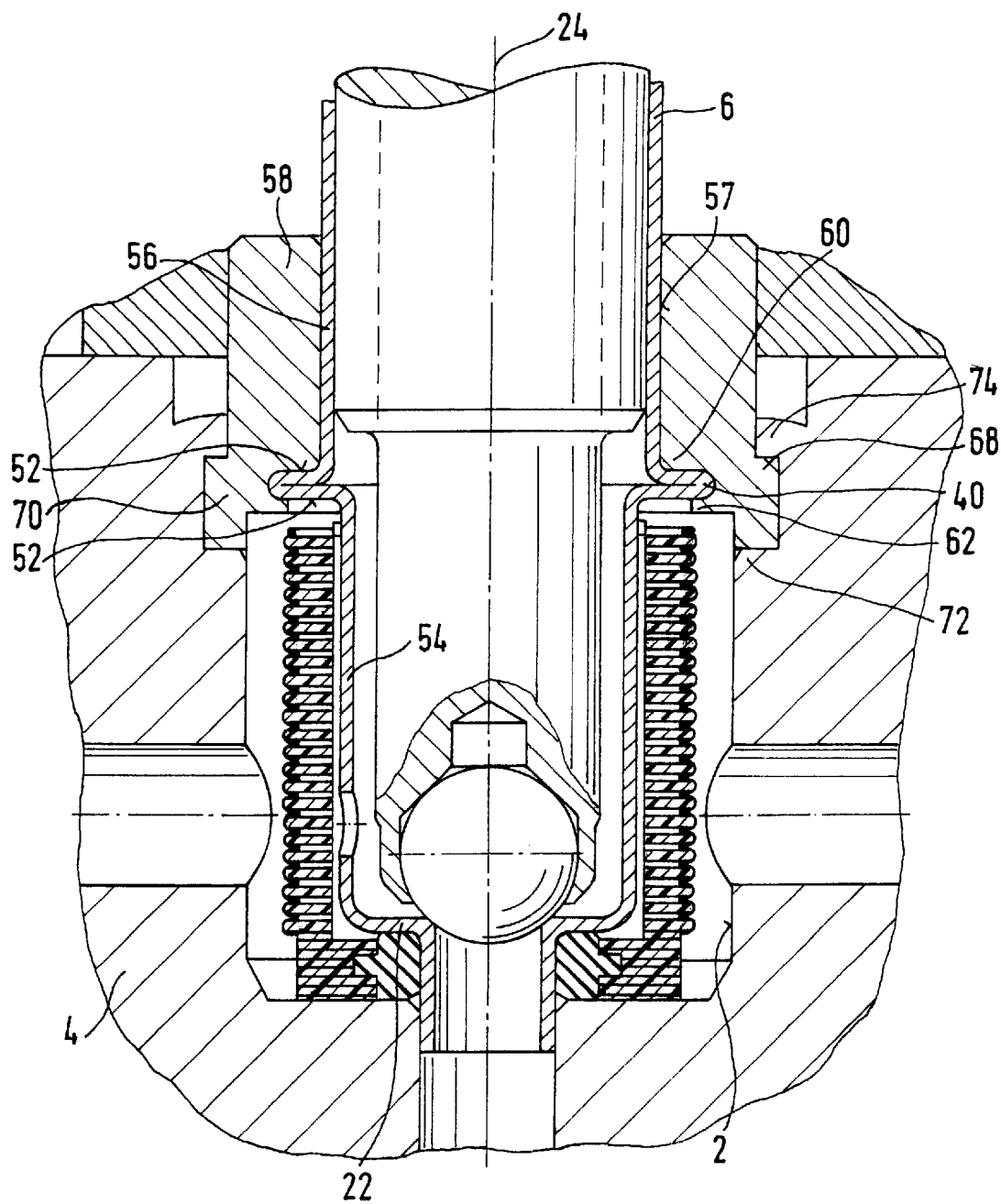
FIG. 2 shows an enlarged detail of FIG. 1.

The flange 40 is formed onto the guide sleeve 6 in the form of a radially outward-pointing crease and has flat end portions 52, extending transversely to the magnet valve axis 24, which rest on one another without any space between them, as shown enlarged in FIG. 2. As a result, the bending radii become quite short, so that the contour of the flange is defined in rimlike fashion. The flange 40 embodied as a crease is created by reshaping, for instance by an upsetting of the guide sleeve 6, and divides a smaller-diameter portion 54, pointing toward the bottom 22 of the guide sleeve 6, from a larger-diameter portion 56 pointing toward the open end of the guide sleeve 6.

The guide sleeve 6 extends through an opening 57 in a valve carrier bush 58 and is carried by the latter. The valve carrier bush 58, on its end pointing toward the bottom 22 of the guide sleeve 6, has a radially inner shoulder 60, on which the flange 40 of the guide sleeve 6 rests. The flange 40 extends as far as the radially inner circumferential wall of the valve carrier bush 58. The flange 40 is braced in fluid- and pressure-tight fashion against the radially inner shoulder 60 of the guide sleeve 6 by a first, inner caulked feature 62.

To that end, material is positively displaced toward the flange 40 of the guide sleeve 6 from the edge of the bore in the end of the valve carrier bush 58 pointing toward the bottom 22 of the guide sleeve 6, thereby creating a material bead that covers the flange 40.

The valve carrier bush 58, the guide sleeve 6, and the components supported by the guide sleeve, such as the magnet core 8, armature 12, valve closing spring 14, ball 18 and filter element 38, together form a valve group 66, which is inserted as a preassembled unit with a set valve stroke into the receiving bore 2 of the valve block 4.

The valve carrier bush 58, on its end pointing toward the bottom 22 of the guide sleeve 6, has a radially outer shoulder 68, which is located essentially in the same radial plane as its radially inner shoulder 60. As a result, on the end of the valve carrier bush 58 pointing toward the bottom 22 of the guide sleeve 6, a radially outward-extending base ring 70 is formed, which upon insertion of the valve group 66 into the valve block 4 is braced against a radially inner shoulder 72 of the receiving bore 2 by a second, outer caulked feature 74.

The second, outer caulked feature 74 is made by positive displacement of material from the bore edge of the receiving bore 2 toward the radially outer shoulder 68 of the valve carrier bush 58. As a result of the second, outer caulked feature 74, the base ring 70 is braced against the radially inner shoulder 72 of the receiving bore 2, and at the same time the inlet conduits 36 are sealed off from the outlet conduit 32 because the sealing ring 42 is fastened and axially compressed between the bottom 30 of the receiving bore 2 and the bottom 22 of the guide sleeve 6. Furthermore, the second, outer caulked feature 74 assures a pressure- and fluid-tight fixation of the valve carrier bush 58 in the receiving bore 2, so that the annular chamber 48 through which hydraulic fluid flows is sealed off from the exterior of the valve block 4 without additional seals.

After the caulking of the valve group 66 in the receiving bore 2, an electrical coil 76 is slipped onto the part of the valve group 66 that protrudes from the valve block 4; this coil radially surrounds the magnet core 8. The coil 76 is surrounded radially by a coil housing 78 of soft magnetic material, into the top and bottom of which a respective annular disk 80, 82, likewise comprising soft magnetic material, is press-fitted; part of the magnet core 8 and part of the guide sleeve 6 extend through the openings of the respective annular disks.

Figure 3:
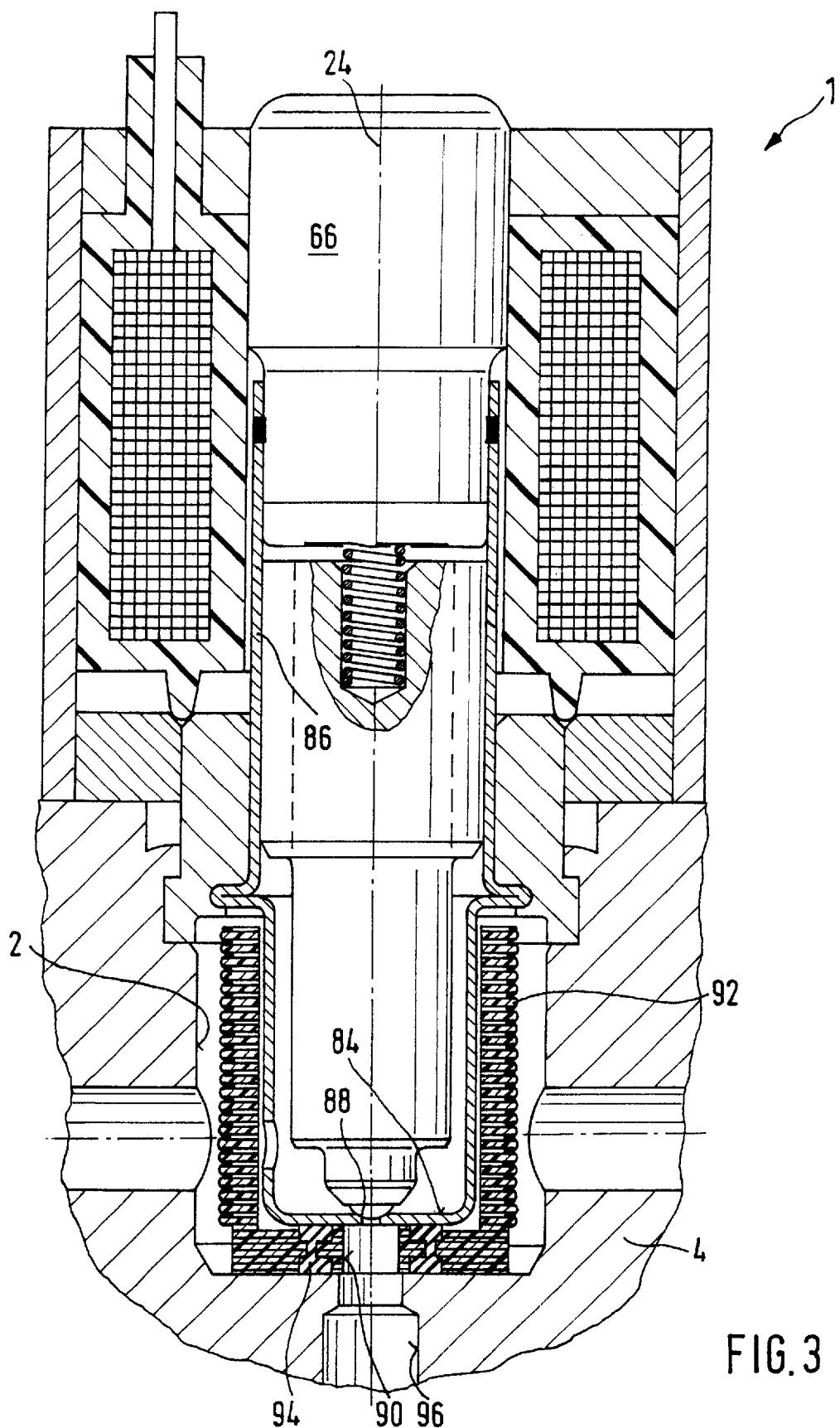
FIG. 3 is a longitudinal section through a further exemplary embodiment of the invention.

In FIG. 3, a further embodiment according to the invention is shown. In a distinction from the above exemplary embodiment, the valve seat 88 embodied in the bottom 84 of the guide sleeve 86 has a substantially smaller diameter. The guide sleeve 86 does not have a formed-on sleevelike extension; instead, the valve seat 88 communicates with a filter opening 90 of the cup-shaped filter element 92, and this opening is coaxial with the magnet valve axis 24 and forms the valve outlet. The filter element 92 is centered on the guide sleeve 86 by its engagement around the guide sleeve. A sealing ring 94, which surrounds the filter opening 90 with radial spacing, is integrated with the bottom of the filter element 92. Downstream of the filter opening 90 is an outlet conduit 96 in the valve block 4; this conduit widens in stages. For the remaining components and component groups, see the remarks and reference numerals pertaining to the preferred exemplary embodiment shown in FIG. 1.

When the coil is excited, a magnetic force is exerted on the axially movable armature 12 in the direction of the magnet core 8, and as a result the armature 12 moves counter to the spring force of the valve closing spring 14 and lifts the ball 18 from the valve seat 20. The magnet valve 1 is then in its open state, and brake fluid from the wheel brake cylinder can flow back to the return pump, passing through the inlet conduits 36, the filter element 38, the valve inlet 34, the valve outlet 28, and the outlet conduit 32.

The foregoing relates to preferred exemplary embodiments of the invention, it being understood that other variants and embodiments are thereof possible within the spirit and scope of the invention, the latter being defined by the appended claims.

I claim:

1. A magnet valve (1), in particular for a slip-controlled hydraulic vehicle brake system comprising a valve carrier bush (58) having an opening (57) with an inner wall therein, a guide sleeve (6; 96), extending through said opening (57) in said valve carrier bush (58) and joined by positive engagement to said bush by means of a caulked feature (62), an armature (12) and a valve closing body (18) displaceably mounted in said sleeve, a magnet core (8) rigidly mounted in one end of said sleeve and a valve seat (20; 88) in the other end of said sleeve, said armature and said valve closing body being displaceable in said sleeve relative to said magnetic core and said valve seat, an electrical coil (76) surrounding said guide sleeve (6; 86) in the region of the magnet core (8), and a flange (40), embodied as a radially outward-pointing crease formed onto said guide sleeve (6; 86) and retained in fluid and pressure-tight fashion by the caulked feature (62) against a radially inner, shoulder (60) on said valve carrier bush (58), said flange (40) having flat end portions (52), extending transversely to a magnet valve axis (24) and resting on one another without any space between them.

2. The magnet valve of claim 1, further comprising an annular bead formed in and extending around said opening (57) of said valve carrier bush (58), said bead being formed by material positively displaced from said bush toward said flange (40) of said guide sleeve (6; 86), said flange (40) being substantially covered by said material bead.

3. The magnet valve of claim 1, wherein said flange (40) extends radially as far as the inner wall of said opening (57) of said valve carrier bush (58).

4. The magnet valve of claim 3, further comprising an annular bead formed in and extending around said opening (57) of said valve carrier bush (58), said bead being formed by material positively displaced from said bush toward said flange (40) of said guide sleeve (6; 86), said flange (40) being substantially covered by said material bead.

5. The magnet valve of claim 1, wherein said guide sleeve (6; 86), on its end remote from said magnet core (8), has a formed-on bottom (22; 84), in which said valve seat (20; 88) is embodied as an opening that is coaxial with said magnet valve axis (24).

6. The magnet valve of claim 5, further comprising a valve inlet (34) embodied as a transverse bore extending through said guide sleeve on the end thereof remote from said magnetic core (8).

7. The magnet valve of claim 6, further comprising a cup-shaped filter element (38; 92) fitted over the end, remote from the magnet core (8), of said guide sleeve (6; 86), said filter element surrounding said guide sleeve (6; 86) in the region of said valve inlet (34) and having a filter opening (39; 90) on its bottom.

8. The magnet valve of claim 7, wherein said valve seat (20) comprises a sleevelike extension (26) extending away from the bottom (22) of said guide sleeve (6), said extension protruding through said filter opening (39) and forming a valve outlet (28).

9. The magnet valve of claim 8, further comprising a sealing ring (42) seated on said sleevelike extension (26), said sealing ring having a radially outer circumferential surface engaging the inside of said filter opening (39), said sealing ring carrying said filter element (38).

10. The magnet valve of claim 9, wherein said sealing ring (42; 94) on one end engages the bottom (22; 84) of said guide sleeve (6; 86) and on the other engages the bottom (30) of a receiving bore (2) of a valve block (4) in which the magnet valve (1) is received.

11. The magnet valve of claim 7, wherein said valve seat (88) communicates with said filter opening (90), said filter opening forming a valve outlet.

12. The magnet valve of claim 11, further comprising a sealing ring (94) integrated into the bottom of the filter element (92) and surrounding said filter opening (90) with a radial spacing.

13. The magnet valve of claim 12, wherein said sealing ring (42; 94) on one end engages the bottom (22; 84) of said guide sleeve (6; 86) and on the other engages the bottom (30) of a receiving bore (2) of a valve block (4) in which the magnet valve (1) is received.

* * * * *